United States Patent
Zare et al.

(10) Patent No.: US 11,941,524 B2
(45) Date of Patent: *Mar. 26, 2024

(54) SYSTEMS AND METHODS FOR TRAINING MACHINE LEARNING MODELS

(71) Applicant: Capital One Services, LLC, McLean, VA (US)

(72) Inventors: Esmat Zare, Frisco, TX (US); Yasong Zhou, Carrollton, TX (US); Wayne Decesaris, Frisco, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,314

(22) Filed: Aug. 30, 2022

(65) Prior Publication Data

US 2022/0414471 A1    Dec. 29, 2022

Related U.S. Application Data

(63) Continuation of application No. 16/705,143, filed on Dec. 5, 2019, now Pat. No. 11,461,646.

(51) Int. Cl.
    *G06N 3/08*    (2023.01)
    *G06N 3/04*    (2023.01)

(52) U.S. Cl.
    CPC ............... *G06N 3/08* (2013.01); *G06N 3/04* (2013.01)

(58) Field of Classification Search
    CPC ....................................................... G06N 3/08
    See application file for complete search history.

(56) References Cited

U.S. PATENT DOCUMENTS

| | | | |
|---|---|---|---|
| 11,182,691 B1 | 11/2021 | Zhang | |
| 11,244,029 B1* | 2/2022 | Benner | G16H 10/60 |
| 11,531,879 B1* | 12/2022 | Teig | G06N 3/08 |
| 11,537,506 B1* | 12/2022 | Dasgupta | G06F 11/1476 |
| 11,734,353 B2* | 8/2023 | Zhang | G06F 18/2148 |
| | | | 706/62 |
| 2003/0004903 A1* | 1/2003 | Kehder | G06N 3/126 |
| | | | 706/13 |
| 2019/0050723 A1* | 2/2019 | Kong | G06N 3/08 |

(Continued)

*Primary Examiner* — Olisa Anwah
(74) *Attorney, Agent, or Firm* — HUNTON ANDREWS KURTH LLP

(57) ABSTRACT

Methods and computer-readable media for repeated holdout validation include collecting independent data representing independent variables; collecting dependent data representing a dependent variable; correlating the independent data with the dependent data; creating a data set comprising the correlated independent and dependent data; generating a plurality of unique seeds; creating a plurality of training sets and a plurality of validation sets; associating each training set with a single validation set; training the neural network a plurality of times with the training sets and seeds to create a plurality of models; calculating accuracy metric values for the models using the validation sets associated with the training sets used to create respective models; performing a statistical analysis of the accuracy metric values; and ranking the independent variables by a strength of correlation of individual independent variables with the dependent variable, when a metric of the statistical analysis exceeds a threshold.

20 Claims, 5 Drawing Sheets

(56) References Cited

U.S. PATENT DOCUMENTS

| | | | |
|---|---|---|---|
| 2020/0117580 A1* | 4/2020 | Lekivetz | G06F 11/368 |
| 2020/0342012 A1* | 10/2020 | Weiss | G06N 20/10 |
| 2020/0349467 A1* | 11/2020 | Teague | G06F 16/9027 |
| 2021/0241177 A1* | 8/2021 | Wang | G06N 20/00 |
| 2022/0051329 A1 | 2/2022 | Toffey et al. | |

* cited by examiner

SYSTEMS AND METHODS FOR TRAINING MACHINE LEARNING MODELS

CROSS-REFERENCE TO RELATED APPLICATIONS

This application is a continuation of U.S. patent application Ser. No. 16/705,143 filed Dec. 5, 2019, the complete disclosure of which is incorporated herein by reference in its entirety.

TECHNICAL FIELD

The present disclosure generally relates to methods and computer-readable media for evaluating survey datasets using machine learning models.

BACKGROUND

Many applications, such as financial systems, supply line management, transportation, and industrial processes, use machine learning models to discover relationships between variables relevant to the application. However, large training datasets may be required to train complex machine learning models including many model parameters.

Numerical methods, such as repeated holdout sampling, can be used to compensate for small datasets. In repeated holdout sampling, subsets of the training dataset are repeatedly selected and used to train the machine learning model, while using the remainder of the dataset for model validation. However, machine learning models trained using repeated holdout sampling can exhibit sensitivity to small changes in training, such as the particular sequence of training data presented or the particular division of the training dataset into training and validation subsets. Accordingly, machine learning models generated from the same training dataset using repeated holdout sampling may provide substantially different outputs for the same input data. Such differences may be especially pronounced for complex machine learning models trained on smaller datasets.

SUMMARY

The disclosed embodiments include a computer-implemented method. The method includes the steps of collecting independent data representing independent variables; collecting dependent data representing a dependent variable; correlating the independent data with the dependent data; creating a data set comprising the correlated independent and dependent data; generating a plurality of unique seeds; creating a plurality of training sets and a plurality of validation sets; associating each training set with a single validation set; training a neural network a plurality of times with the training sets and seeds to create a plurality of models; calculating accuracy metric values for the models using the validation sets associated with the training sets used to create respective models; performing a statistical analysis of the accuracy metric values; and ranking the independent variables by a strength of correlation of individual independent variables with the dependent variable, when a metric of the statistical analysis exceeds a threshold.

The disclosed embodiments further include a non-transitory computer-readable medium. This computer-readable medium contains instructions to perform operations including collecting independent data representing independent variables; collecting dependent data representing a dependent variable; correlating the independent data with the dependent data; creating a data set comprising the correlated independent and dependent data; generating a plurality of unique seeds; creating a plurality of training sets and a plurality of validation sets; associating each training set with a single validation set; training a neural network a plurality of times with the training sets and seeds to create a plurality of models; calculating accuracy metric values for the models using the validation sets associated with the training sets used to create respective models; performing a statistical analysis of the accuracy metric values; and ranking the independent variables by a strength of correlation of individual independent variables with the dependent variable, when a metric of the statistical analysis exceeds a threshold.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DESCRIPTION

Figure 1:
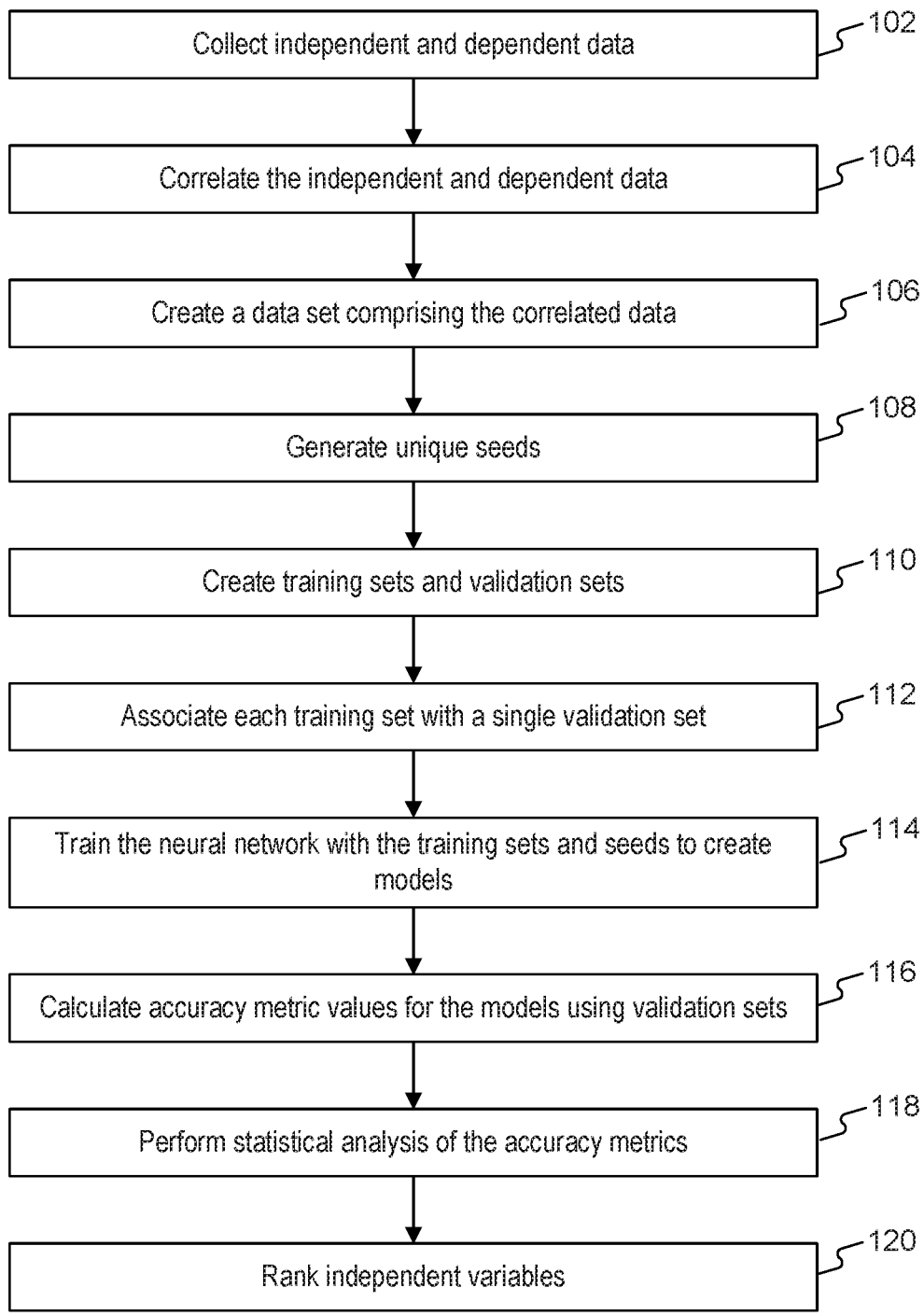
FIG. 1 depicts a flowchart of an exemplary method for training a machine learning model, consistent with the disclosed embodiments.

In the following detailed description, numerous specific details are set forth in order to provide a thorough understanding of the disclosed example embodiments. However, it will be understood by those skilled in the art that the principles of the example embodiments may be practiced without every specific detail disclosed herein. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Reference will now be made in detail to the disclosed embodiments, examples of which are illustrated in the accompanying drawings.

As described above, machine learning models trained on small datasets can exhibit high variability (e.g., significant variation between models in outputs generated given the same or similar inputs). In particular, machine learning models trained to predict behavior from survey data can exhibit high variability, as surveys typically include many questions and often have low response rates.

The disclosed embodiments address the problem of machine learning model variability by training multiple models, identifying models satisfying a prediction criterion, and identifying important model parameters for the identified models. In some embodiments, the important model parameters can be identified based on the contributions of the model parameters to each of the identified models. For example, the k-most important model parameters in each of the identified models can be identified. In various embodiments, the important model parameters can be identified based on a function of the contributions of the model parameters to each of the identified models. For example, the contributions of the model parameters to at least some of the identified models can be combined (e.g., averaged or weighted averaged). The k-most important model parameters, so combined, can be identified. The identified parameters can be used to inform actions concerning the model outputs (e.g., to predict the best way to modify undesirable behavior based using limited survey data). The identified parameters, or functions of the identified parameters, can be used as inputs for additional machine learning (e.g., model parameters identified as relevant using a regression analysis or decision tree analysis can be used as features for a neural network model).

Consistent with disclosed embodiments, datasets may include elements corresponding to real-world conditions, events, and/or measurements. The elements may include variables having associated values. The variables may include independent and dependent variables, where independent variables correspond to actual or potential model parameters and dependent variables correspond to actual or potential model outputs. The datatypes of the values are not intended to be limiting. For example, a dataset may include transaction data, financial data, demographic data, public data, government data, environmental data, traffic data, network data, transcripts of video data, and/or other data. A dataset may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Consistent with disclosed embodiments, a machine learning model may include a decision tree model, regression model (e.g., linear or logistic regression model), support vector machine, k-nearest neighbor model, neural network, or the like. Given a set of input data, the machine learning model can generate a label or classification for the input data, predict a corresponding set of output data, or perform other tasks. The machine learning model can be trained using a set of training data. Depending on the type of machine learning model, this training can be supervised, semi-supervised, or unsupervised. The machine learning model can be implemented using one or more computing devices (e.g., wearable device, smartphone, laptop, desktop, workstation, server, cloud computing platform, or the like). The one or more computing devices can be configured to obtain input data. For example, the one or more computing devices can generate the input data (e.g., by taking measurements), receive the input data (e.g., from other devices), and/or retrieve the input data (e.g., from one or more remote or local databases).

FIG. 1 depicts exemplary computer-implemented process 100 for training a machine learning model, consistent with disclosed embodiments. The training process can be performed using one or more computing devices. The one or more computing devices can be configured with instructions (e.g., computer code) to perform the training. While the same computing devices are described as performing each step of process 100, for simplicity of description, different computing devices or groups of computing devices can be used to perform different steps (or different functions within each step). Consistent with disclosed embodiments, process 100 can include steps of obtaining a dataset, training multiple machine learning models, and identifying important parameters of the resulting collection of machine learning models.

In step 102 of process 100, the one or more computing devices can obtain data, consistent with disclosed embodiments. For example, the data can be generated by the one or more computing devices, received from one or more other systems, and/or retrieved from one or more other systems. In some embodiments, values for at least one independent variable may be obtained separately from values for at least one dependent variable. For example, values for independent variables may be generated from business records, while values for dependent variables may be generated from customer survey results. As a further example, when values for independent variables are generated from business records, such variables may include business measurements such as sales value, sales quantity, sales frequency, transaction time, user referrals, and/or a success ratio of completed transactions to initiated transactions. To continue this example, when values for dependent variables are generated from customer survey results, such values can be the results as obtained, or can reflect additional analysis or processing of the results (e.g., net values calculated from the obtained survey results).

Returning to FIG. 1, in step 104 of process 100, the one or more computing devices can associate values of independent variables with values of dependent variables, consistent with disclosed embodiments. That is, individual values of dependent variable can be matched to individual values of independent variables. This association can depend on a predetermined relationship between the matched dependent variable values and independent variable values. As a non-limiting example, the dependent variable values and independent variable values may be from the same source (e.g., same sensor, business establishment, individual, etc.). For example, if the independent data are measurements of wind speed, angle of attack, air density, air temperature, and ambient pressure, and the dependent data is a measurement of force generated by a wing, individual measurements may be correlated based on the time at which measurements were taken. As another example, if the independent data are measurements of sales value, transaction success rate, and sales frequency, and the dependent variable is a user satisfaction metric obtained by a survey answered by a user, individual data points may be correlated if they originate from the same user. In some embodiments, there may be more independent data points than dependent data points. This could occur, for instance, if a user's transaction history is available but the user did not answer a survey. In this case, the surplus data may be discarded at step 104.

In step 106 of process 100, the one or more computing devices can create an original training dataset comprising the associated independent and dependent data, consistent with disclosed embodiments. A non-limiting example of creating such a dataset is detailed below with regards to FIGS. 4 and 5. The dataset may include elements (e.g., rows, objects, documents, etc.), each element containing associated values of the independent and dependent variables. The original training dataset may be stored in a database for future analysis or may be immediately analyzed.

The one or more computing devices can then generate a plurality of machine learning models. In some aspects, such generation can include obtaining pairs of training and validation datasets (e.g., creating, retrieving, or receiving such pairs). For example, creation of each associated training and validation dataset can include selection of elements in the original training dataset and assignment of the selected element to either the training or validation dataset. The particular method for assigning elements to training or validation datasets is not intended to be limiting. For example, the elements can be selected randomly, pseudo-randomly, or deterministically.

In some embodiments, as an additional example, in step 108 of process 100, the one or more computing devices can create a plurality of unique seeds. The unique seeds can be used to create each machine learning model. For example, one or more of the unique seeds can be used to initialize a random number generator used to perform tasks related to generation of a machine learning model (e.g., creation of the training and validation datasets, performance of training updates, etc.). These seeds may be generated randomly, by a random number generator, or pseudo-randomly. The seeds may be, for instance, an individual number, or an array of multiple numbers. The seeds may be stored in a database to replicate past results of training the neural network.

In some embodiments, as an additional example, in step 110 of process 100, the one or more computing devices can create the plurality of training and validation datasets. In some instances, the training sets and validation sets are subsets of the original training dataset created at step 106, and include elements of this dataset (e.g., sets of values for the independent and dependent variables). In some embodiments, the training sets and validation sets can together include all, or substantially all (e.g., >90%), of the elements in the original training dataset. For example, 75% of the data set may be assigned to a training set, and 25% of the data set may be assigned to a corresponding validation set. Assigning an individual element of the original dataset to a training set or a validation set may be based on a random number, or a pseudo-random number. For instance, in a simplified example, a data set may contain 30 data points, each containing independent data points and a dependent data point, and process 100 may assign 20 data points to a training set and 10 data points to a validation set. Process 100 may generate 10 random integers between 1 and 30. The 10 random integers may correspond to 10 data points, which are assigned to the validation set. The remaining, unchosen data points may be assigned to the training set. This may then be repeated multiple times to generate many training sets and validation sets.

In some embodiments, as an additional example, in step 112 of process 100, the one or more computing devices can associate each training set with a single validation set. Furthermore, in some embodiments, step 112 includes pairing training and validation sets such that no individual data point is in both a training set and a validation set of a pair. This ensures that the neural network is not validated with the same data with which it is trained, which may lead to deceptively high model accuracy. For example, a data set may contain individual data points A, B, and C. A first training set may include points A and B, and a second training set may include points B and C. A first validation set, paired with the first training set, would then include data point C, and would not include data points A or B so there is no intersection between the training set and validation set. Similarly, a second validation set, paired with the second training set, would include data point A, but not data points B or C. Furthermore, this example illustrates that an individual data point may alternately be in a training set and a validation set of different pairs, but is not in a training set and a validation set of the same pair.

In some embodiments, the union of a paired training set and validation set may be equal to the original data set. In this way, every data point is included in a pair, either as part of the training set or the validation set. Alternatively, some data points may be excluded from a training set/validation set pair. This may occur, for instance, if there are millions of data points and computational limits only permit processing of a hundred thousand data points simultaneously.

In some embodiments, as an additional example, in step 114 of process 100, the one or more computing devices can train the machine learning models using the training and validation datasets, consistent with disclosed embodiments. For example, when the machine learning model includes one or more decision trees, the one or more computing devices can train the machine learning models using the XGBoost software library, or a similar tool. In this case, a model may be created by operating XGBoost with inputs of a seed value and a paired training set and validation set. In this way, different models may be created for many different seed and training set combinations. In some embodiments, a number of training sets and a number of validation sets are equal to a number of unique seeds. A number of models is also equal to the number of unique seeds, and each model is created by training with one seed and one pair of a training set and a validation set. In this way, every seed and every pair of training set and validation set may be used to train and evaluate a model, and no two models share the same seed, training set, or validation set, thereby creating greater diversity in model training and leading to models that more robustly analyze complex data sets. Though described above with regards to decision trees, one of skill in the art would appreciate that the disclosed embodiments are not so limited.

In step 116 of process 100, the one or more computing devices can calculate accuracy metric values for the models using the validation sets associated with the training sets used to create respective models, consistent with disclosed embodiments. For example, after a model is created using a training set, the model accuracy is evaluated using the validation set that was associated with the training set at step 112. An accuracy metric value may be calculated for each model, or a portion of the models. The accuracy metric value can reflect how accurately each model predicts the validation data provided to it. Any accuracy metric may be used in step 116, such as a true positive rate or a true negative rate. In some embodiments, the Area Under Curve (AUC), also known as the Area Under the Receiver Operating Characteristics (AUROC), may be used. In the non-limiting decision tree example provided above, XGBoost can be used to determine the AUC for each model. As would be appreciated by those of skill in the art, other suitable training packages may be used to calculate the AUC, or another suitable accuracy metric, for machine learning models generated using such a training package.

In step 118 of process 100, the one or more computing devices can rank model parameters based on the contribution of the model parameters to the machine learning models (e.g., a degree or sensitivity of dependence of values of the dependent variables on the values of the independent variable). For example, in the non-limiting decision tree example provided above, XGBoost can be configured to provide metrics such as weight, gain, cover, and/or similar metrics describing the contribution of decision tree features to the predictive power of the decision tree model. As would be appreciated by those of skill in the art, similar metrics can be provided for other types of machine learning models and/or when using other training packages. In some embodiments, the rank of a model parameter can depend on the contribution of the model parameter to a particular machine learning model, or to the models in the plurality of machine learning models. For example, a degree of the contribution may be the average contribution across the models in the plurality of machine learning models. For example, in a system evaluating the prevalence of diabetes, independent variables may be age, sex, a fasting blood sugar level, and the dependent variable may be a binary indicator of diabetes or no diabetes. The one or more computing devices can rank these model parameters by first calculating the average weight associated with age in the models, the average weight associated with sex, and the average weight associated with fasting blood sugar. These averages may then be ordered. For instance, the average weight for age may be the greatest magnitude (i.e., largely positively or negatively correlated). Such results may support a conclusion that age contributed the most to the output classification of diabetes or no diabetes. As described above, this conclusion may be more reliable than a conclusion based on a single model, as single models trained on limited datasets exhibit increased variance.

In some embodiments, the one or more computing devices can determine whether the plurality of machine learning models satisfies an accuracy criterion. For example, the one or more computing devices can determine one or more statistics (e.g., mean, median, standard deviation, or the like) of the accuracy metric values for the plurality of machine learning models. The one or more computing devices can be configured to end the analysis without ranking the model parameters, or not provide or return the ranked model parameters, when the one or more statistics fails to satisfy the accuracy criterion. For example, the accuracy criterion may be a threshold value (e.g., a predetermined value between 0.5 and 0.8) and the one or more computing devices can be configured to end the analysis without ranking the model parameters when an average of the accuracy metric values for the plurality of machine learning models does not exceed this threshold value. In some embodiments, the one or more computing devices can perform the ranking using only the machine learning models having accuracy metric values satisfying the accuracy criterion. For example, when two of three machine learning models have accuracy metric values satisfying the accuracy criterion (e.g., exceeding a predetermined threshold), the one or more computing devices can perform the ranking using only these two machine learning models.

Figure 2:
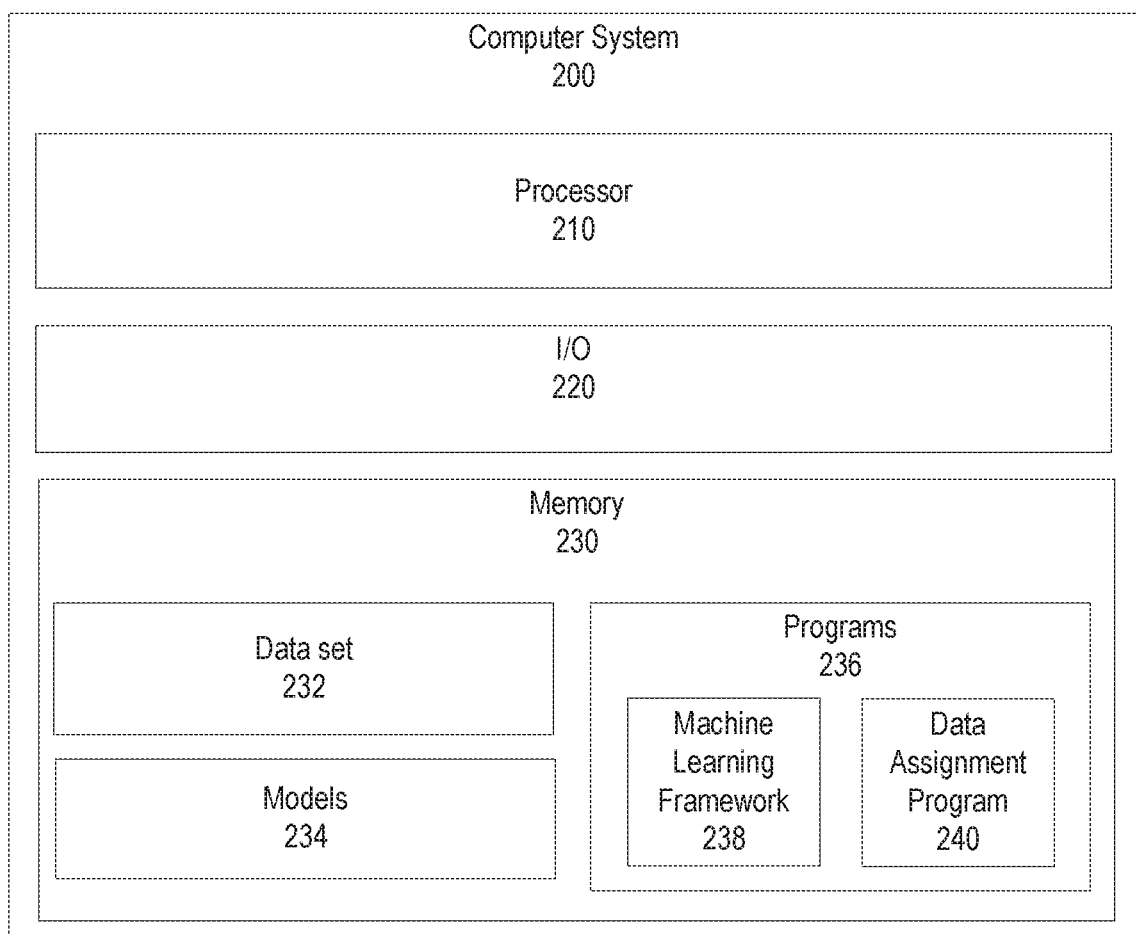
FIG. 2 depicts an exemplary system for implementing a machine learning model, consistent with disclosed embodiments.

FIG. 2 depicts an exemplary computing system (computing system 200) suitable for implementing process 100, consistent with disclosed embodiments. Computing system 200 may include a computing device, a computer, a server, a server cluster, a plurality of clusters, and/or a cloud service, consistent with disclosed embodiments. As shown, computing system 200 may include one or more processors 210, one or more I/O devices 220, and one or more memory units 230. In some embodiments, some or all components of computing system 200 may be hosted on a device, a computer, a server, a cluster of servers, or a cloud service. In some embodiments, computing system 200 may be a scalable system configured to efficiently manage resources and enhance security by provisioning computing resources in response to triggering events and terminating resources after completing a task (e.g., a scalable cloud service that spins up and terminates container instances).

FIG. 2 depicts an exemplary configuration of computing system 200. As will be appreciated by one skilled in the art, the components and arrangement of components included in computing system 200 may vary. For example, as compared to the depiction in FIG. 2, computing system 200 may include a larger or smaller number of processors, I/O devices, or memory units. In addition, computing system 200 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processor 210 may comprise known computing processors, including a microprocessor. Processor 210 may constitute a single-core or multiple-core processor that executes parallel processes simultaneously. For example, processor 210 may be a single-core processor configured with virtual processing technologies. In some embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 210 may execute various instructions stored in memory 230 to perform various functions of the disclosed embodiments described in greater detail below. Processor 210 may be configured to execute functions written in one or more known programming languages.

I/O device 220 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments.

I/O device 220 may be configured to manage interactions between computing system 200 and other systems using a network. In some aspects, I/O device 220 may be configured to publish data received from other databases or systems not shown. This data may be published in a publication and subscription framework (e.g., using APACHE KAFKA), through a network socket, in response to queries from other systems, or using other known methods. Data may be survey data or transaction data, as described herein. In various aspects, I/O 220 may be configured to provide data or instructions received from other systems. For example, I/O 220 may be configured to receive instructions for generating data models (e.g., type of data model, data model parameters, training data indicators, training parameters, or the like) from another system and provide this information to programs 236. As an additional example, I/O 220 may be configured to receive data including sensitive data from another system (e.g., in a file, a message in a publication and subscription framework, a network socket, or the like) and provide that data to programs 236 or store that data in, for example, data set 232 or models 234.

In some embodiments, I/O 220 may include a user interface configured to receive user inputs and provide data to a user (e.g., a data manager). For example, I/O 220 may include a display, a microphone, a speaker, a keyboard, a mouse, a track pad, a button, a dial, a knob, a printer, a light, an LED, a haptic feedback device, a touchscreen and/or other input or output devices.

Memory 230 may be a volatile or non-volatile, magnetic, semiconductor, optical, removable, non-removable, or other type of storage device or tangible (i.e., non-transitory) computer-readable medium, consistent with disclosed embodiments. As shown, memory 230 may include data set 232, including one of at least one of encrypted data or unencrypted data. Memory 230 may also include models 234, including weights and parameters of neural network models.

Programs 236 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 236 may be written in one or more programming or scripting languages. One or more of such software sections or modules of memory 230 may be integrated into a computer system, non-transitory computer-readable media, or existing communications software. Programs 236 may also be implemented or replicated as firmware or circuit logic.

Programs 236 may include a machine learning framework 238 (e.g., XGBOOST or the like) and a statistical analysis program 240. Modules of programs 236 may be configured to receive, retrieve, and/or generate models, consistent with disclosed embodiments. Modules of programs 236 may be configured to perform operations in coordination with one another. In some embodiments, programs 236 may be configured to conduct an authentication process, consistent with disclosed embodiments.

Machine learning framework 238 may include programs (scripts, functions, algorithms) to assist creation of, train, implement, store, receive, retrieve, and/or transmit one or more machine learning models. Machine learning framework 238 may be configured to assist creation of, train, implement, store, receive, retrieve, and/or transmit, one or more ensemble models (e.g., models comprised of a plurality of models). In some embodiments, training of a model may terminate when a training criterion is satisfied. Training criteria may include number of epochs, training time, performance metric values (e.g., an estimate of accuracy in reproducing test data), or the like. Machine learning framework 238 may be configured to adjust model parameters and/or hyperparameters during training. For example, machine learning framework 238 may be configured to modify model parameters and/or hyperparameters (i.e., hyperparameter tuning) using an optimization technique during training, consistent with disclosed embodiments. Hyperparameters may include training hyperparameters, which may affect how training of a model occurs, or architectural hyperparameters, which may affect the structure of a model. Optimization techniques used may include grid searches, random searches, gaussian processes, Bayesian processes, Covariance Matrix Adaptation Evolution Strategy techniques (CMA-ES), derivative-based searches, stochastic hill-climbing, neighborhood searches, adaptive random searches, or the like.

In some embodiments, machine learning framework 238 may be configured to generate models based on instructions received from another component of computing system 200 and/or a computing component outside computing system 200. For example, machine learning framework 238 can be configured to receive a visual (e.g., graphical) depiction of a machine learning model and parse that graphical depiction into instructions for creating and training a corresponding neural network. Machine learning framework 238 can be configured to select model training parameters. This selection can be based on model performance feedback received from another component of machine learning framework 238. Machine learning framework 238 can be configured to provide trained models and descriptive information concerning the trained models to model memory 234.

Data assignment program 240 may be configured to select data from data set 232 and create training sets and validation sets, as described herein. Data assignment program 240 may include a random number generator or a pseudo-random number generator to permit random assignment of individual data points to training sets or validation sets. Data assignment program 240 may be configured to access information stored in the data set 232, and also to write additional information reflecting assignment to training sets and validation sets to the data set 232. Data assignment program 240 may be configured to read and write data using SQL PARQUET, AVRO, SQLITE, POSTGRESQL, MYSQL, ORACLE, HADOOP, CSV, JSON, PDF, JPG, BMP, and/or other data formats.

Figure 3:
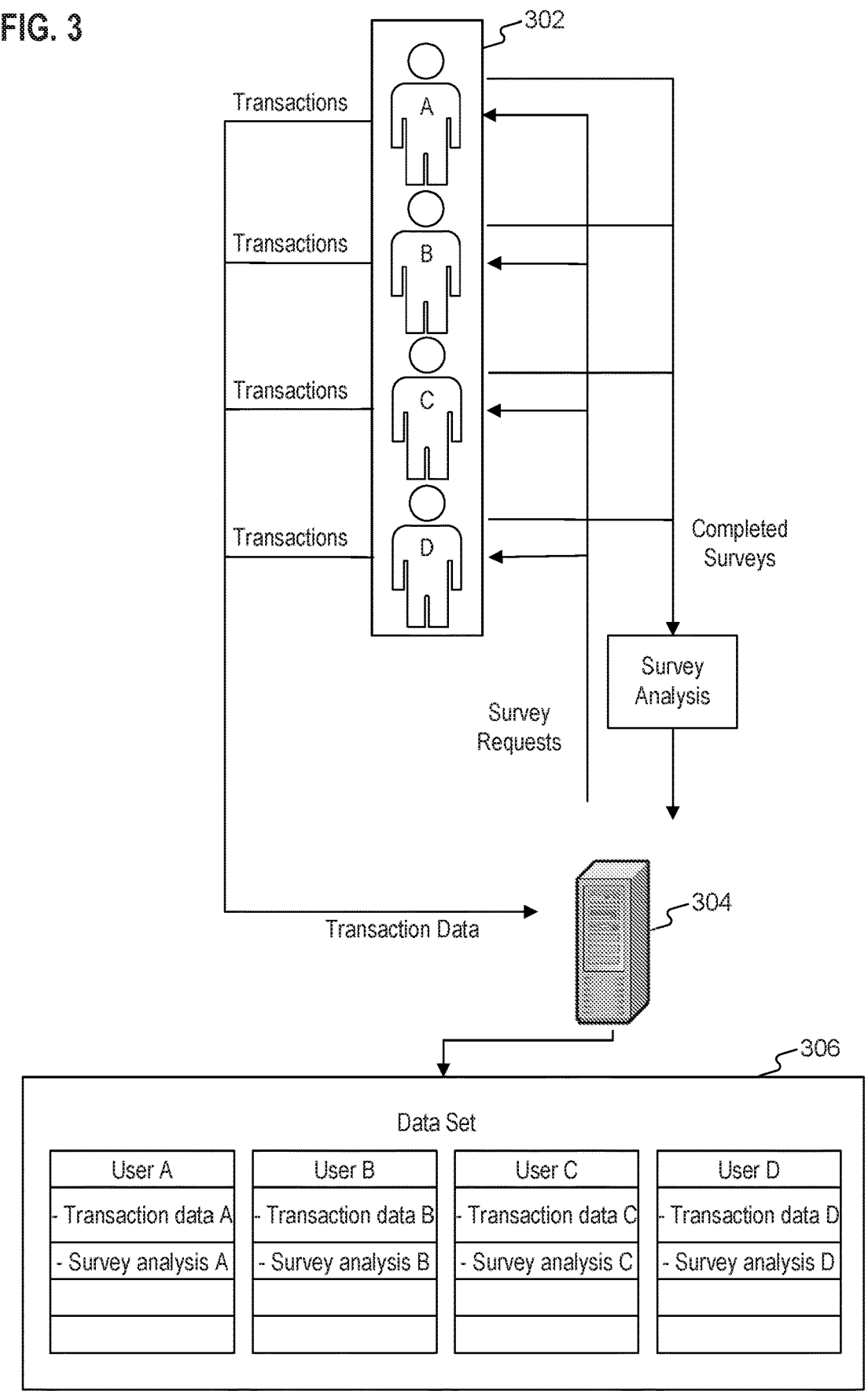
FIG. 3 depicts an exemplary system for generating a survey dataset, consistent with disclosed embodiments.

FIG. 3 depicts an exemplary system for generating a survey dataset suitable for use with process 100, consistent with disclosed embodiments. As depicted in FIG. 3, users 302 may be associated with transactions (e.g., users 302 may conduct the transactions, be associated with a financial services account used to conduct the transactions, be legally responsible for the transactions, or the like). Server 304 can be configured to record transaction data detailing the transactions. In some embodiments, server 304 can be part of a financial service system associated with a financial institution or can obtain the transaction data from such a financial service system. The transaction data can include, as a non-limiting example, an indication a user associated with the transaction (e.g., account number, user identifier, or the like), transaction amount, transaction time, geographic transaction location, counterparty (e.g., the individual or entity with whom the transaction occurred), time since prior transaction or prior similar transaction (e.g., when the transaction is a car purchase, time since car previously purchased), transaction method, or the like). Server 304 can include one or more computing devices configured to implement process 100 (e.g., computing system 200). In this non-limiting example, the transaction data comprises independent variables as described above with regards to process 100.

Surveys may be sent to users 302 in response to performance of the transactions and consistent with disclosed embodiments. The surveys may be automatically provided by a computing system (e.g., server 304 or another system). The provided surveys may include written surveys (e.g., email, text message, mail, or the like) and/or telephonic surveys (e.g. manual calling, interactive voice response, or the like). The particular method by which surveys are provided is not intended to be limiting. A survey may include questions concerning the transaction (e.g., the ease of the transaction, the behavior of the counterparty to the transaction, the terms of the transaction, the perceived benefits of the transaction, the relative value of the transaction compared to other potential transactions, or the like). A survey may also include questions concerning future user behavior (e.g., likelihood that the user will repeat the transaction, likelihood that the user will recommend the transaction to others). The survey may also be configured to enable association of the survey response data with corresponding transaction data. For example, the survey can include a user identifier or a transaction identifier.

Survey response data can be obtained by a computer system (e.g., server 304 or another system). For example, electronic survey response data can be received directly by the computer system, while other forms of survey response data can be input (e.g., scanned or manually entered) to the computer system. The particular method by which survey response data is received is not intended to be limiting. In some embodiments, additional processing can be performed on survey response data. For example, completed surveys can be analyzed to determine a net user value. In this example, a survey may include a question asking users how likely they are to recommend a colleague to use a certain service on a scale of 0 to 10. Additional processing may be performed to assign a category of "active promoter" to users who respond with a 9 or 10, "passive promoter" to users responding with 7 or 8, and "detractor" to users responding with scores below 7. In some embodiments, the category, rather than the numerical score, may then be used as a dependent variable. In various embodiments, a percentage of detractors can be subtracted from the percentage of promoters to get the net user value. The net user value can then be used as a dependent variable. In this non-limiting example, survey response data (or values derived from the survey response data during additional processing) comprise a dependent variable as described above with regards to process 100.

In some embodiments, server 304 can be configured to associate the survey response data with corresponding transaction data, thereby creating dataset 306. With reference to FIG. 3, transaction data for transactions associated with users A, B, C, and D can be associated with survey response data provided by user A, B, C, and D. In this toy example, data set 306 contains four data points, one for each of User A, B, C, and D. In some aspects, each data point corresponds to a transaction and includes the (independent) transaction data and the (dependent) survey response data for the transaction. FIG. 3 illustrates a small data set for simplicity. In practice, data sets would likely be far larger and more complex. For example, a data set may include many more independent variables, sources (e.g., users), and dependent variables. Additionally, a data set may be missing data. For example, users may not respond to surveys, or to all questions in a survey, resulting in independent data that are uncorrelated to dependent data. In some embodiments, the data set may omit incomplete or uncorrelated data, or indicate missing data using a Not-A-Number symbol, or the like. As would be appreciated by one of skill in the art, in some applications only a small fraction of users that conduct transactions will provide survey response data.

Figure 4:
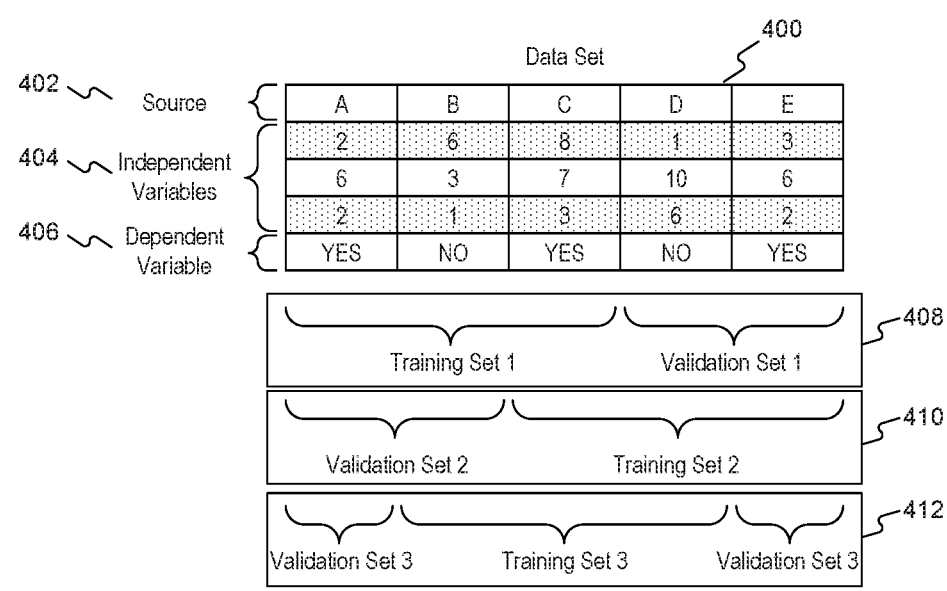
FIG. 4 depicts exemplary training of machine learning models, consistent with disclosed embodiments.

FIG. 4 depicts exemplary training machine learning models, consistent with disclosed embodiments. In the non-limiting example depicted in FIG. 4, data set 400 contains individual data points from five sources 402: A, B, C, D, and E (corresponding to the users depicted in FIG. 3). Each individual data point contains (independent) transaction data comprising values 404 for three variables. Additionally, each individual data point contains (dependent) survey data comprising a single Boolean-valued variable. The number and data type of the independent and dependent variables depicted in this example are not intended to be limiting.

As depicted in FIG. 4, the at least one computing system of process 100 can be configured to generate three training set/validation set pairs from dataset 400. Pair 408 includes training set 1, containing individual data points A, B, and C.

Validation set 1 contains individual data points D and E. Similarly, pair 410 includes training set 2, containing data points C, D, and E, and validation set 2, containing data points A and B. Pair 412 includes training set 3, containing data points B, C, and D, and validation set 3, containing data points A and E. In this example, no data point is omitted from a paired training set and validation set, and no data point is repeated between a training set and a validation set in a pair. For instance, in pair 408, each of the individual data points are either in training set 1 or validation set 1. Furthermore, data point A is only in training set 1 and not in validation set 1. Pair 412 also shows that data points do not need to be sequentially assigned. For instance, validation set 3 includes data points A and E. Each of the pairs 408, 410, and 412 may then be used to train models and calculate accuracy metric values.

Figure 5:
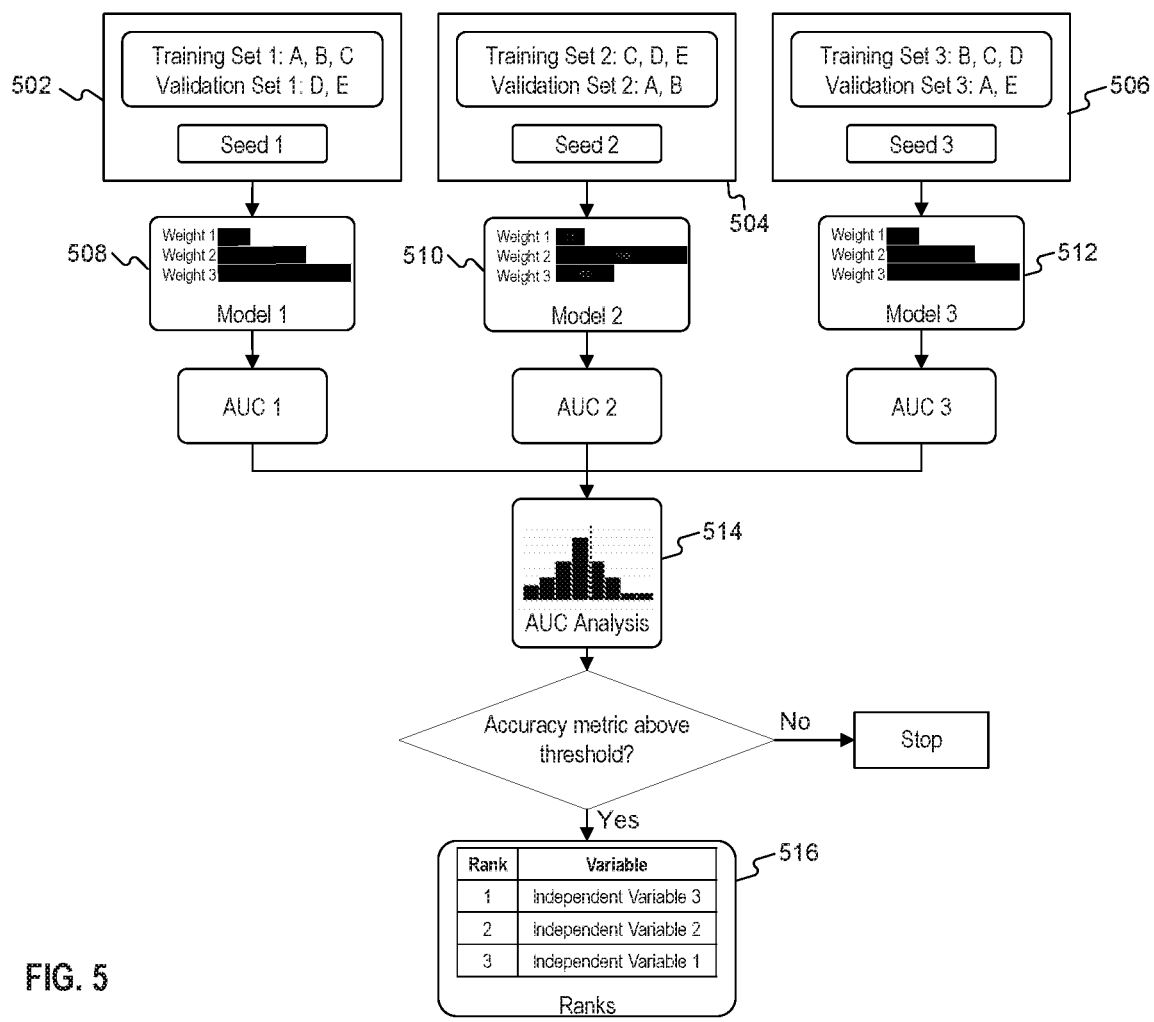
FIG. 5 depicts an exemplary method for identifying predictive machine learning parameters using multiple machine learning models, consistent with disclosed embodiments.

FIG. 5 depicts an exemplary method for identifying predictive machine learning parameters using multiple machine learning models, consistent with disclosed embodiments. In the non-limiting example depicted in FIG. 5, the at least one computer of process 100 can be configured to generate three models based on three collections of input data (input data 502, input data 504, and input data 506). These three collections of input data can each comprise a training dataset and a validation dataset. In some embodiments, a seed may be associated with each collection of input data. In some embodiments, this seed may have been used to generate the training and validation datasets and/or may be used to train the model (e.g., by initializing a random number generator used to generate the training and validation datasets and/or used to train the model). A model can be created for each set of input data (models 508, 510, and 512). For example, each model may comprise weights associated with each independent variable, as illustrated in FIG. 5. The at least one computing system of process 100 can then be used to calculate an accuracy metric for each model.

In FIG. 5, for instance, input 502 is used to create model 1. Model 1 is then evaluated using the validation set from input 502, yielding an accuracy metric value. In this non-limiting example, the at least one computing system can calculate an AUC (e.g., AUC 1, AUC 2, and AUC 3) for each model. As can be appreciated, other accuracy metrics may be chosen—this example is not intended to be limiting. The at least one computing system of FIG. 100 can be configured to analyze the calculated AUC values (AUC analysis 514). This analysis may involve determining statistics of the calculated AUC values. For example, a distribution of AUC values can be estimated. This estimated distribution can be analyzed to determine whether an accuracy criterion for the machine learning models has been satisfied. In this non-limiting example, the at least one computing system can be configured to determine an average AUC value, which can be compared to a predetermined threshold value. Alternatively, the accuracy criterion can depend on one or more of the standard deviation, mean, median, mode, or other statistic of the estimated distribution.

If the accuracy metric is below the threshold value, indicating that the models are unable to produce reliable predictions, the process may stop. On the other hand, if the accuracy metric is above the threshold value, ranks 516 are determined for the independent variables. For example, as shown in the ranks 516, independent variable 3, corresponding to weight 3, is ranked first because it has the strongest correlation to the dependent variable. The correlation strength may be determined, for instance, by calculating the average weight for each independent variable across all models, or by summing the weights associated with each independent variable across all models. As will be appreciated by one skilled in the art, other methods to rank independent variables may be employed.

Systems and methods disclosed herein involve unconventional improvements over prior methods of training and using machine learning models. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include software, but methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including Javascript, C, C++, Java, PHP, Python, Ruby, Perl, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A method comprising:
 collecting independent data representing independent variables;
 collecting dependent data representing a dependent variable;
 correlating the independent data with the dependent data;
 creating a data set comprising the correlated independent and dependent data;
 creating a plurality of training sets and a plurality of validation sets from the data set;
 associating each training set with a single validation set;
 training a neural network a plurality of times with the training sets and seeds to create a plurality of models;
 calculating accuracy metric values for the models using the validation sets associated with the training sets used to create respective models;
 performing a statistical analysis of the accuracy metric values; and
 ranking the independent variables by a strength of correlation of individual independent variables with the dependent variable, when a metric of the statistical analysis exceeds a threshold, wherein:
  the accuracy metric comprises an Area Under the Curve (AUC),
  the statistical analysis comprises calculating an average, and
  the metric of the statistical analysis comprises the average.

2. The method of claim 1, wherein:
 the dependent variable comprises a user satisfaction metric; and
 the independent variables comprise business transaction variables.

3. The method of claim 2, wherein:
 the dependent data comprises data generated from surveys; and
 the independent data comprises data generated by analysis of business records.

4. The method of claim 3, wherein:
 the dependent data comprises a net value calculated by analysis of survey results.

5. The method of claim 3, wherein the business records comprise at least one of:
 sales value;
 sales quantity;
 sales frequency;
 transaction time;
 user referrals; or
 a success ratio, calculated as a ratio of completed transactions to initiated transactions.

6. The method of claim 1, further comprising:
 generating a plurality of unique seeds; and
 training the neural network the plurality of times with the seeds to create the plurality of models,
 wherein the unique seeds are generated by one of random or pseudo-random procedures.

7. The method of claim 1, wherein associating each training set with a single validation set further comprises:
 pairing training and validation sets such that no individual data point is in both a training set and a validation set of a pair.

8. The method of claim 7, wherein:
 a number of training sets and a number of validation sets is equal to a number of unique seeds;
 a number of the models is equal to the number of unique seeds; and
 each model is created by training with one seed and one pair of a training set and a validation set.

9. The method of claim 7, wherein:
 individual data points are assigned to a training set or a validation set based on one of a random number or a pseudo-random number.

10. A non-transitory computer-readable medium containing instructions to perform operations comprising:
 collecting independent data representing independent variables;
 collecting dependent data representing a dependent variable;
 correlating the independent data with the dependent data;

creating a data set comprising the correlated independent and dependent data;
creating a plurality of training sets and a plurality of validation sets from the data set;
associating each training set with a single validation set;
training a neural network a plurality of times with the training sets and seeds to create a plurality of models;
calculating accuracy metric values for the models using the validation sets associated with the training sets used to create respective models;
performing a statistical analysis of the accuracy metric values; and
ranking the independent variables by a strength of correlation of individual independent variables with the dependent variable, when a metric of the statistical analysis exceeds a threshold, wherein:
the accuracy metric comprises an Area Under the Curve (AUC),
the statistical analysis comprises calculating an average, and
the metric of the statistical analysis comprises the average.

11. The medium of claim 10, wherein:
the dependent variable comprises a user satisfaction metric; and
the independent variables comprise business transaction variables.

12. The medium of claim 11, wherein:
the dependent data comprises data generated from surveys; and
the independent data comprises data generated by analysis of business records.

13. The medium of claim 12, wherein:
the dependent data comprises a net value calculated by analysis of survey results.

14. The medium of claim 12, wherein the business records comprise at least one of:
sales value;
sales quantity;
sales frequency;
transaction time;
user referrals; or
a success ratio, calculated as a ratio of completed transactions to initiated transactions.

15. The medium of claim 10, wherein the operations further comprises:
generating a plurality of unique seeds; and
training the neural network the plurality of times with the seeds to create the plurality of models,
the unique seeds are generated by one of random or pseudo-random procedures.

16. The medium of claim 10, wherein associating each training set with a single validation set further comprises:
pairing training and validation sets such that no individual data point is in both a training set and a validation set of a pair.

17. The medium of claim 16, wherein:
a number of training sets and a number of validation sets is equal to a number of unique seeds;
a number of the models is equal to the number of unique seeds; and
each model is created by training with one seed and one pair of a training set and a validation set.

18. The medium of claim 16, wherein:
individual data points are assigned to a training set or a validation set based on one of a random number or a pseudo-random number.

19. The method of claim 1, wherein each of the independent variables is associated with a weight.

20. The medium of claim 10, wherein each of the independent variables is associated with a weight.

* * * * *